United States Patent [19]

LeGrange

[11] 4,218,242

[45] Aug. 19, 1980

[54] SILVER RECOVERY METHOD

[76] Inventor: John E. LeGrange, 3300 Lightner La., Oklahoma City, Okla. 73179

[21] Appl. No.: 251

[22] Filed: Jan. 2, 1979

[51] Int. Cl.$^2$ ............................................. C22B 11/04
[52] U.S. Cl. .................................. 75/101 R; 75/0.5 A; 75/108; 75/118 R; 423/27; 423/34; 423/371
[58] Field of Search ................. 75/118 P, 118 R, 108, 75/101 R, 0.5 A, 105, 106; 423/29, 34, 42, 43, 27, 368, 371

[56] References Cited

U.S. PATENT DOCUMENTS

| | | | |
|---|---|---|---|
| 580,683 | 4/1897 | Gopner et al. | 75/105 X |
| 1,192,945 | 8/1916 | Sherwood | 75/118 R |
| 1,527,942 | 2/1925 | Weisberg | 75/108 |
| 1,614,523 | 1/1927 | Cooper | 423/371 |
| 2,131,535 | 9/1938 | Hedley | 75/105 |
| 2,845,330 | 7/1958 | Zabban | 423/43 |
| 3,311,468 | 3/1967 | Davidoff | 75/118 R |
| 3,649,250 | 3/1972 | Dorenfeld et al. | 75/107 |
| 3,989,800 | 11/1976 | Gansinger | 423/371 |

OTHER PUBLICATIONS

Laitinen, *Chemical Analysis*, McGraw-Hill Book Co., N.Y., N.Y., 1960, pp. 225-227.
Scott, *Standard Methods of Chemical Analysis*, vol. 1, 5th Edn., D. Van Nostrand, Inc., N.Y., N.Y., 1939, p. 823.
Thorpe, *Dictionary of Applied Chemistry*, 4th Edn., vol. X, Longmans, Green & Co., N.Y., N.Y., 1950, p. 756.

*Primary Examiner*—G. Ozaki
*Attorney, Agent, or Firm*—Dunlap, Codding & McCarthy

[57] ABSTRACT

A silver recovery method and apparatus performing highly specific separation of silver from source material containing organic and inorganic materials, including transition metals, comprising the steps of digesting source material with nitric acid solution to form an acidic reaction mixture; thereafter adding increments of sodium or potassium cyanide solution to the separated liquid phase of the reaction mixture; discontinuing addition of cyanide solution when silver(I) cyanide precipitate ceases to form after incremental additions of cyanide solution; and separating silver(I) cyanide precipitate of high purity from the liquid phase of the reaction mixture.

15 Claims, 3 Drawing Figures

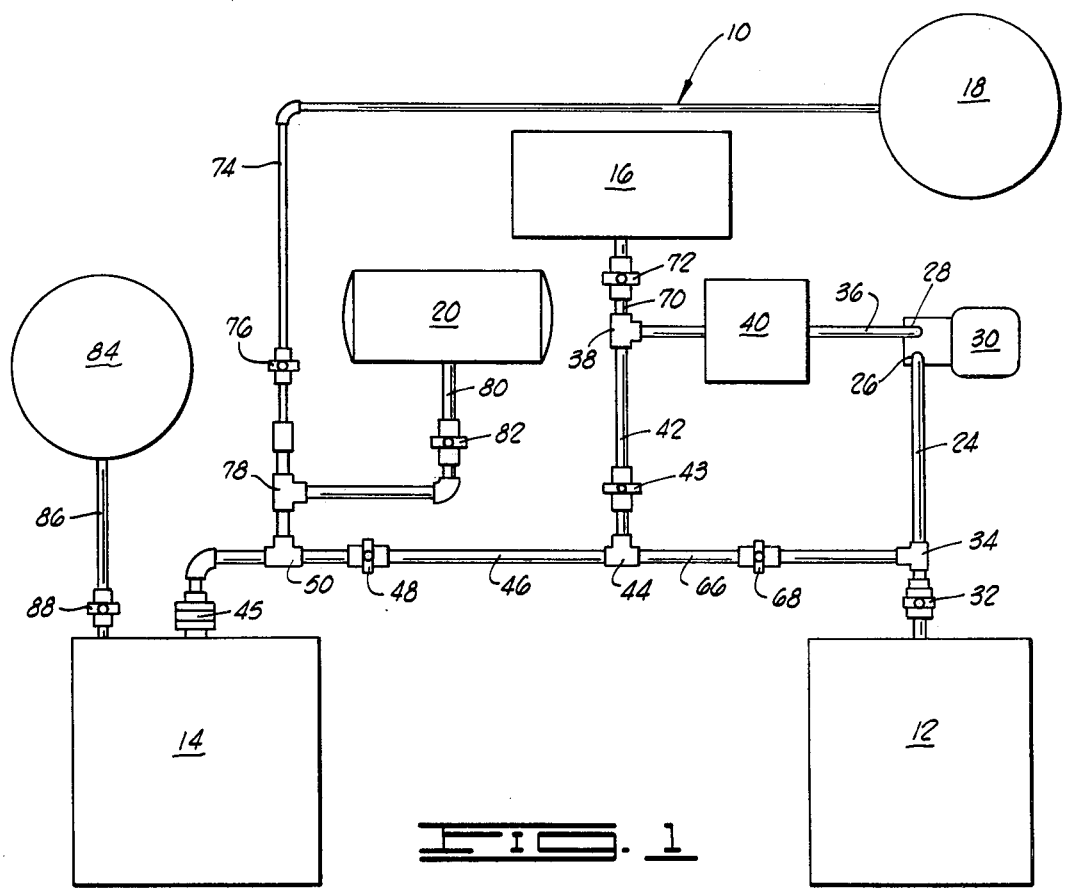

SILVER RECOVERY METHOD

1. FIELD OF THE INVENTION

The present invention relates to processes for recovery of silver from source material, and more particularly to processes for the precipitation of dissolved silver from source material as recoverable silver(I) cyanide.

2. DISCUSSION

The dramatic increase in the price of silver, to levels three to four times higher than market values prevailing in the early 1970's, has led to serious consideration by industrial silver users of alternatives to continued procurement of silver on the open market. One alternative, substitution of other less expensive metals for silver, has been largely unavailable in industrial applications because of the unique photosensitive, conducting, and lubricant properties of silver metal and compounds. Consequently, particular interest has focused on recycling industrial silver scrap which would otherwise be discarded as waste, as a means of reducing silver purchase requirements. While consideration of recycling has been largely economically motivated, it is important to note that recycling also carries significant ecological benefits by reducing amounts of potentially harmful silver compounds which may otherwise be discharged into the environment.

Thusfar, most silver recycling efforts have been directed to recovering silver from scrap material generated by photography-related industries, which are the largest consumers of industrial silver. These recovery processes have generally involved separation of silver from the various organic, non-metallic and non-transition metal compounds to be found in photographic scrap material. An example of such a process is found in U.S. Pat. No. 3,649,250, issued to Dorenfeld et al., which involves separation of silver from the numerous organic compounds and acid salts found in scrap photocopier paper. A further example of photography-related silver reclamation is contained in U.S. Pat. No. 1,527,942, issued to Weisberg, for separation of silver from a solution containing sodium thiosulfate and aluminum sulfate.

While the reclamation processes used to recover photography-related silver have generally proven operable and economical, these processes have lacked the flexibility to be applied successfully to other types of industrial silver scrap. When silver is used industrially as an electrical conductor or as a high temperature lubricant, for example, recoverable silver will often be associated in scrap material with one or more transition metals, such as iron, copper, nickel, or chromium. The photography-related recycling processes, because they are designed for scrap containing no transition metal other than silver, generally lack the specificity necessary to separate silver from other transition metals.

The present invention provides a process for separating silver from various transition metals, as well as from the non-transition metals and organic and non-metallic substances which may be encountered in source material. The process involves the digestion of silver bearing source material with a solution containing nitric acid to form a substantially acidic reaction mixture, in which silver will dissolve as silver(I) nitrate. Once the digestion step is completed, a solution of potassium or sodium cyanide is added gradually to the separated liquid phase of the reaction mixture, causing formation of the white flocculant precipitate, silver(I) cyanide, by the following reaction:

$$Ag^+(l) + CN^{3l}(l) \rightarrow AgCN(s). \tag{1}$$

Addition of cyanide is discontinued when the silver(I) cyanide precipitate ceases to form upon the addition of an increment of cyanide solution. The silver(I) cyanide precipitate produced may then be separated from the liquid phase of the reaction mixture and used directly in electroplating solutions, or may be converted to silver metal by conventional high temperature methods.

While cyanide solutions have been used to separate silver from source materials such as native ores, the action of cyanide in these processes has been as a dissolving agent rather than as a precipitating agent for silver. The dissolving reaction occurs when excess cyanide ions in solution cause the insoluble silver(I) cyanide to form a soluble complex ion, as follows:

$$Ag^+(l) \xrightarrow{CN^-} AgCN(s) \xrightarrow{CN^-} Ag(CN)_2^-(l). \tag{2}$$

Thus, in prior art silver recovery processes, silver(I) cyanide has been an intermediate only, rather than an end product.

Use of cyanide solution as a precipitating agent with silver has conventionally been limited to analytical chemistry techniques in which gravimetric and volumetric determinations of silver or cyanide ions have been sought. Such techniques, however, do not offer the capability of separating silver from many transition metals, because silver(I) cyanide precipitation is accompanied by formation of insoluble cyanide salts of these transition metals, which are inseparable from the silver(I) cyanide precipitate.

The present invention makes use of the fact that many transition metal cyanides are substantially soluble in acidic solutions, in which silver(I) cyanide is only sparingly soluble. By carrying out the silver(I) cyanide precipitation step in acid solution, as distinguished from the neutral or alkaline solutions of the above described analytical techniques, the present invention offers a highly selective precipitation of silver which leaves other transition metals, as well as other inorganic and organic substances, dissolved in the liquid phase of the reaction mixture.

An apparatus capable of carrying out the process of the present invention in a safe, efficient and economical manner is also provided herein. In its preferred embodiment, the apparatus features a pair of covered reaction vessels, the first of which functions as a digestion vessel into which a solution containing nitric acid is added to source material to form a reaction mixture. A communication assembly is provided to effect the transfer of the liquid phase of the reaction mixture from the digestion vessel to a precipitation vessel, in which precipitation of dissolved silver in the liquid phase of the reaction mixture is carried out.

A cyanide solution reservoir and a source of inert pressurized gas discharge into a common conduit terminating within the precipitation vessel in a filter assembly. A plurality of cylindrical filter sleeves disposed on the filter assembly permit rapid and complete multidirectional dispersion of cyanide solution added to the precipitation vessel. Bubbles of air from the pressurized air source, entering the precipitation vessel via the filter assembly, disperse the cyanide solution and mix the contents of the vessel during cyanide addition. When cyanide addition is complete, the filter sleeves of the filter assembly serve as a collecting surface for precipitated silver(I) cyanide, as the liquid remaining in the precipitation vessel is transferred to a waste reservoir by a communication assembly.

The present invention offers an efficient method and apparatus for separating silver from various transition metals with which it is frequently associated in industrial scrap, as well as from other inorganic and organic substances. The near-quantitative yield of the process assures that practically all silver in scrap material may be recovered, and the high specificity of the process for silver assures that the recovered silver is of high purity. Because it involves only a short sequence of steps using relatively inexpensive reagents and apparatus, the present invention provides an economical method and apparatus for silver recovery which may be used in a wide range of industrial contexts.

It is an object of the present invention to provide a process for the recovery of silver which is capable of separating silver from source material containing various transition metals as well as other inorganic and organic substances.

It is a further object of the present invention to provide an apparatus for the separation of silver from source material which is capable of safe, efficient and economical operation.

Other objects, features and advantages of the present invention will become apparent from the following detailed description of the preferred embodiment when read in conjunction with the accompanying drawings and appended claims.

BRIEF DESCRIPTION OF THE DRAWINGS

FIG. 1 is a top view of the preferred embodiment of the silver recovery apparatus of the present invention. The digestion vessel 12 and precipitation vessel 14 are shown with covers.

FIG. 2 is a top view of the uncovered precipitation vessel 14 of the silver recovery apparatus shown in FIG. 1, showing the filter assembly disposed within the vessel.

FIG. 3 is an enlarged view showing two of the cylindrical filter sleeves shown in the filter assembly of FIG. 2. One of the sleeves is drawn in partial cutaway detail, to show the perforated internal pipe disposed within the filter sleeve.

DESCRIPTION

A nitric acid solution containing between about 1% and 50% nitric acid by volume is added to the source material from which silver is to be recovered. Any silver metal within the source material will be dissolved by the following reaction:

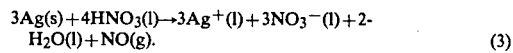

$$3Ag(s) + 4HNO_3(l) \rightarrow 3Ag^+(l) + 3NO_3^-(l) + 2H_2O(l) + NO(g). \quad (3)$$

Preferably, a nitric acid concentration near 50% will be used, as this concentration affords the fastest dissolving action of metallic substances in the source material. Sufficient nitric acid solution must be added to the reaction mixture to bring the reaction between acid and source material to completion. This point can be determined visually, when additions of the nitric acid solution no longer cause visible reaction or gas evolution. The digestion step may be conducted at temperatures between approximately 18° C. (65° F.) and 82° C. (180° F.), with the higher temperatures affording faster reactions.

Because of the corrosive action of nitric acid solutions on ferrous metals, the use of concentrated nitric acid solution to recover silver associated with ferrous parts generally renders these parts unsuitable for reuse. Accordingly, if it is desired to recover silver while substantially retaining the structural integrity of any ferrous metal source material, digestion may be performed with a solution composed of nitric acid and sulfuric acid, in which the concentration of nitric acid may range from 1% to 5% by volume, with the higher nitric acid concentration offering greater reaction rates. Addition of the sulfuric acid/nitric acid solution to the source material is performed under reaction conditions identical to those used for the previously discussed digestion step employing nitric acid/water solution.

Further acceleration of the digestion of the source material by either the nitric acid/water solution or the nitric acid/sulfuric acid solution may be obtained by adding an accelerator such as urea to the acid solution. A concentration of about 0.1% urea by weight in the acid solution has been found adequate for purposes of the present invention.

Once the acid digestion of the source material is complete, the liquid phase must be separated from the remainder of the reaction mixture, preferably by filtration. This filtration effects the separation of the dissolved silver from such metals as aluminum, titanium, platinum and gold, which are substantially insoluble in nitric acid. Those solids separated from the liquid phase of the reaction mixture may be discarded as waste, or may, as appropriate, be processed for recovery of other recyclable substances.

The liquid phase of the reaction mixture is next preferably diluted with sufficient water to render its acidity in the pH range between about 0.5 and 3.0. This step is necessary because silver(I) cyanide, the end product of the method of the present invention, is more soluble in concentrated acid than in less concentrated acid solutions. Accordingly, in order to maximize the recovery of silver(I) cyanide precipitate, the reaction mixture should be maintained at a somewhat higher pH than that of the concentrated acid solutions used in the digestion step.

A solution of sodium cyanide is next added to the reaction mixture as described below. Potassium cyanide may be used as a substitute for sodium cyanide, but the lower cost and higher purity of commercially available sodium cyanide renders it preferable. The concentration of sodium cyanide in the solution should be selected at a level sufficiently high that the addition reaction may be brought to the endpoint quickly, but not at a level so high as to cause development in the reaction mixture of regions of cyanide supersaturation which may result in precipitation of metals other than silver. Concentrations of sodium cyanide ranging between approximately 0.2 M and 10 M have proven adequate, with concentrations between approximately 0.5 M and 1 M being preferred.

The sodium cyanide solution is added to the liquid phase of the reaction mixture gradually, in small dropwise increments. The addition is preferably accompanied by agitation of the liquid phase of the reaction mixture, to assure that the cyanide is distributed uniformly about the reaction mixture, and additionally to assure adequate mixing of the contents of the reaction vessel. A flow of inert pressurized gas, such as air, provides adequate agitation for purposes of the present invention.

As each increment of sodium cyanide solution is added to the reaction mixture, a flocculant region of silver(I) cyanide precipitate forms by the reaction of the added cyanide ions with any dissolved silver which is present. The precipitation reaction is as follows:

$$Ag^+(l) + CN^-(l) \rightarrow AgCN(s). \tag{4}$$

Such transition metals as chromium, nickel, copper, iron, tin, manganese, molybdenum, and zinc will remain in solution during the precipitation, because of the solubility of their cyanide salts in the acidic liquid phase of the reaction mixture. The method of the present invention thus offers the capability of separating silver from those transition metals which are frequently associated with silver in industrial applications. Similarly, other organic and inorganic substances will remain in solution during the cyanide addition step, thus effecting the separation of these substances from the silver in the reaction mixture. In particular, it should be noted that acidic hydrogen ions in the reaction mixture remain in solution, rather than combining with added cyanide to generate hydrogen cyanide gas, because of the greater affinity of cyanide ions for transition metal ions, in preference to hydrogen ions.

When substantially all dissolved silver in the reaction mixture has been precipitated as silver(I) cyanide, the addition of cyanide solution is discontinued. Further addition of cyanide solution after this point would cause precipitation of the cyanide salts of the other dissolved transition metals in the reaction mixture, and ultimately, generation of hydrogen cyanide. The endpoint of the silver(I) cyanide precipitation may be determined visually, by observing when the addition of an increment of cyanide solution ceases to cause clouding of the reaction mixture due to the formation of the flocculant precipitate.

As an alternative to the above described visual endpoint determination, the endpoint may be determined when iron is present in the source material by adding a small amount of potassium thiocyanate to the reaction mixture as an indicator. As long as dissolved silver is present, thiocyanate ions will complex with the silver. When the silver has been completely precipitated by cyanide, and the endpoint of the present method thus reached, thiocyanate ions will react with iron in the reaction mixture, which will take on the strong red color characteristic of the complex ion $FeSCN^{++}$. It should be noted, however, that use of a thiocyanate indicator will introduce impurities into the recovered silver(I) cyanide which may render it unsatifactory for subsequent use in an electroplating bath.

After the addition of cyanide solution to the reaction mixture is discontinued, the reaction mixture may be separated from the silver(I) cyanide precipitate, preferably by filtration. Spectroscopic analysis of the reaction mixture remaining after separation of the silver(I) cyanide precipitate has shown it to contain no more than 100 parts silver per million, or 0.01% silver, thus illustrating the near-quantitative silver separation offered by the method of the present invention. After separation, the mixture may be further processed for recovery of other recyclable material, or, if this is not practical, the reaction mixture may be discarded as waste.

The silver(I) cyanide precipitate is rinsed by several washings of water to remove any remaining acid traces. Spectroscopic analysis of the silver(I) cyanide precipitate thus produced has shown it to have a purity of 99.96% or higher. Silver(I) cyanide of this purity may be used directly in an electroplating bath, or if elemental silver is desired, the cyanide precipitate may be heated to 260° C. (500° F.), causing chemical decomposition of the precipitate to silver metal and cyanogen gas.

The silver recovery process of the present invention thus offers a highly specific separation of silver from source material in near-quantitative yields. Because the efficiency and specificity of the process do not depend on whether it is conducted on a large or small scale, the process is suitable for a variety of industrial contexts requiring recovery of scrap silver.

The following specific examples further illustrate certain features of the method of the present invention:

EXAMPLE 1

One hundred mililiters (100 ml.) of an 11 M solution of nitric acid was added to a 1000 ml. Erlenmeyer flask containing the following materials and amounts:
  1.0 g silver shavings (99.99% purity)
  1.0 g reagent grade iron powder (reduced electrolytic, 96% purity);
  1.0 g analytical grade nickel (reduced powder);
  1.0 g analytical reagent grade copper (99.8% purity, fine granular);
  0.1 g analytical reagent grade cadmium metal;
  0.1 g analytical reagent grade tin powder;
  0.1 g analytical reagent grade zinc dust (95% purity).

The mixture was heated to approximately 80° C. (176° F.) for 30 minutes, and was thereafter cooled with 200 ml. distilled water. The liquid phase of the reaction mixture was next separated from undissolved residue by filtration, and was thereafter diluted to a volume of 1000 ml. with distilled water. The pH of the liquid phase at this point was 0.7, as determined by an Orion model 401 pH meter.

Two 100 ml. samples of the liquid phase of the reaction mixture were drawn off for dropwise titration with solutions of analytical grade sodium cyanide. A 0.08 M sodium cyanide solution was titrated against the first sample, with stirring, until 8 ml. cyanide solution was added. The liquid phase of the reaction mixture was then filtered off to yield 0.0575 grams of silver(I) cyanide precipitate. It should be noted that the first sample was not titrated completely to the endpoint of the silver(I) cyanide precipitation because of the lengthy time required with the low concentration of cyanide solution used.

A 0.5 M sodium cyanide solution was titrated dropwise against the second 100 ml. sample of the liquid phase of the reaction mixture. The endpoint was reached after 2 ml. of sodium cyanide solution was added, and 0.1164 g. silver(I) cyanide precipitate was thereafter separated from the liquid phase of the reaction mixture by filtration.

A blank solution was prepared by dissolving 50 g. analytical reagent grade sodium cyanide in 500 ml. distilled water, and the precipitate collected from the first titration was dissolved in the blank solution to a volume of 100 ml. Similarly, the precipitate collected from the second titration was dissolved in the blank solution to a volume of 100 ml.

The dissolved samples of silver(I) cyanide precipitate, and a sample of the blank solution, were next tested on a Perkin-Elmer model 603 atomic absorption spectrometer (with microprocesser) for the presence of those metals other than silver which were included in the reaction mixture. The amounts of these metals, in parts per million were as follows:

|  | Cd | Cu | Fe | Sn | Ni | Zn |
|---|---|---|---|---|---|---|
| AgCN precipitate formed with 0.08 M NaCN solution | 1 | 1 | 3 | 8.0 | 1 | 4 |
| AgCN precipitate formed with 0.5 M NaCN solution | 0 | 1 | 3 | 8.5 | 1 | 1 |
| Blank solution (NaCN) | 0 | 1 | 2 | 8.5 | 1 | 1 |

The tin result for the precipitate produced by the 0.08 M sodium cyanide titration, which is lower than due to instrumentation limitations.

The liquid phase of the reaction mixture remaining after titration with 0.5 M sodium cyanide solution was tested on the same atomic absorption instrument discussed above. The amount of silver remaining in the liquid phase was measured at 28 parts per million.

The approximately 10 mg. of solid residue which remained after nitric acid dissolution of the source metal was analyzed on an ETEC Autoscan scanning electron microscope/microprobe. The residue composition was as follows:

| Element | % by weight |
|---|---|
| Sn | 78.3 |
| Fe | 16.0 |
| Unknown | 5.7 |

Analysis of gas samples taken during addition of sodium cyanide solution to the liquid phase of the reaction mixture has been conducted on a Perkin-Elmer model 270B mass spectrometer. The results of this analysis indicate that no detectable traces of hydrogen cyanide are produced during this step.

EXAMPLE 2

The following materials and amounts were added to a solution of 19 ml. sulfuric acid and 1 ml. nitric acid at a temperature of approximately 82° C. (180° F.):
  0.5025 g silver shavings (99.99% purity);
  0.2705 g analytical reagent grade cadmium shavings;
  0.7788 g analytical reagent grade copper;
  1.0930 g analytical grade nickel (reduced powder, low cobalt).

An additional 19 ml. sulfuric acid, 3 ml. nitric acid and 100 ml. distilled water were added, and the mixture was heated at 82° C. for 30 minutes, so as to dissolve added metals. While copper and nickel would not be subject to chemical attack by a nitric acid/sulfuric acid solution not containing water, water was included in the acid solution in this example to demonstrate the operability of the present process under circumstances where water is accidentally or intentionally introduced into the reaction mixture.

The solution was cooled and diluted with water to a volume of 1000 ml. At a temperature of approximately 24° C. (75° F.) the pH of the solution was measured at 0.75 on an Orion model 401 pH meter. A 0.5 M solution of analytical grade sodium cyanide was titrated, with stirring, against a 100 ml. sample of the liquid phase of the reaction mixture. The endpoint of silver(I) cyanide precipitation was reached after 1.5 ml. of sodium cyanide solution was added.

The precipitate was collected by filtration and washed with distilled water. It was then dissolved in 100 ml. of a blank solution formed in Example 1 by dissolving 50 g. analytical reagent grade sodium cyanide in 500 ml. water. A sample of the blank solution containing the dissolved precipitate was tested on a Perkin-Elmer model 603 atomic absorption spectrometer (with microprocessor). The levels in the precipitate of those metals originally in the reaction mixture are shown below in parts per million. Also shown are the levels of these metals in the blank solution, as determined in Example 1:

|  | Cd | Cu | Ni |
|---|---|---|---|
| AgCN precipitate formed with 0.5 M NaCN solution | 0 | 1 | 1 |
| Blank solution (NaCN) | 0 | 1 | 1 |

The liquid phase of the reaction mixture was next analyzed on the same atomic absorption instrument and was determined to contain 8 parts per million silver.

Apparatus

As shown in FIGS. 1 and 2 the silver recovery apparatus of the present invention, generally designated by reference numeral 10, comprises in its preferred embodiment a digestion vessel 12, in which nitric acid digestion of scrap material is carried out, and a precipitation vessel 14, in which cyanide precipitation of dissolved silver in the liquid digestion product is carried out. Communication assemblies, described more specifically hereafter, effect the transfer of liquid from the digestion vessel 12 to the precipitation vessel 14, and from the precipitation vessel 14 to a waste reservoir 16. A cyanide solution reservoir 18 and a source of inert pressurized gas 20 discharge into a shared conduit which terminates in the lower portion of the precipitation vessel 14 in a filter assembly 22. The operation of these components of the present invention will be described hereafter in greater detail.

More particularly, the digestion vessel 12 and the precipitation vessel 14 (also referred to herein as reaction vessels) comprise open tanks constructed of an acid and temperature resistant material. With regard to the digestion vessel 12, in which nitric acid dissolution of the source material will be accomplished at temperatures up to approximately 82° C. (180° F.), a tank of polypropylene construction is preferable because of its resistance to temperatures as high as 110° C. (230° F.). With regard to the precipitation vessel 14, in which cyanide solution will be added to the acidic reaction mixture at somewhat lower temperatures than those prevailing in the digestion vessel 12, either a polyethylene or polypropylene tank is adequate for purposes of the present invention. Examples of tanks appropriate for use as reaction vessels are the polypropylene cylindrical tank and the heavy-duty cylindrical polyethylene tank, both available in a variety of capacities from United States Plastic Corporation, Lima, Ohio 45801. The appropriate capacities of the tanks to be used as the digestion vessel 12 and the precipitation vessel 14 will be dictated by the volume of material which is sought to be processed in a single batch.

The top of each tank functioning as a reaction vessel is sealed by a cover (not shown), in order to contain possibly harmful or noxious gases which are generated during the course of the silver recovery process. So that the operator of the apparatus may observe the chemical reactions taking place in the reaction vessels, and accordingly begin or discontinue addition of reagents as required, the covers are constructed of a substantially transparent material. Appropriate acid-resistant transparent cover materials would include Plexiglas and Lexan.

Each cover is fitted about its periphery with a gasket (not shown) formed from an acid and temperature resistant material such as fluorosilicone rubber, so that a gas-tight seal may be formed between each cover and its corresponding tank. Conventional releasable latching mechanisms (not shown) are used to maintain each cover in sealed contact with its tank. An outlet port may be provided in each tank cover or in the upper portion of each tank, and may be connected by conventional piping to a gas disposal area.

A first communication assembly effects filtered fluid communication between the digestion vessel 12 and the precipitation vessel 14. The first communication assembly comprises a first conduit 24 connecting the lower interior portion of the digestion vessel 12, via a conventional access port, to the suction port 26 of a pump 30. A pump appropriate for the purposes of the present invention is the Vanton self-priming Sealless Chemical Pump, model CCB-PY60B, which is manufactured by the Vanton Pump and Equipment Corporation, Hillside, New Jersey 07205. The design of pumps of this type is well-known in the art and will not be described for purposes of this application. Interposed in the first conduit 24, intermediate to the pump 30 and the digestion vessel 12, is a first valve 32, preferably a ball valve. Intermediate to the first valve 32 and the suction port 26 of the pump 30 is a first tee connection 34.

The first communication assembly further comprises a second conduit 36 connecting the pressure port 28 of the pump 30 to a second tee connection 38. Interposed in the second conduit 36 is a filter 40 for removing solids and soluble organic substances from fluid transferred by the first communication assembly. A suitable filter for the purposes of the present invention is the Carbo-Klear model CKXR Carbon Treatment System, available from Summit Scientific Corporation, 31 Dwight Place, Fairfield, New Jersey 07006. It should be noted that, for purposes of the present invention, the filter 40 may be disposed in the first conduit 24, or the filter 40 may be disposed in a third conduit 42 or fourth conduit 46, to be described hereafter.

Further comprising the first communication assembly are the third conduit 42 connecting the second tee connection 38 to a third tee connection 44. Intermediate to the second tee connection 38 and third tee connection 44 is a second valve 43, preferably a ball valve, which is interposed in the third conduit 42. The fourth conduit 46 connects the third tee connection 44 to a union connector 45. Interposed in the fourth conduit 46 is a third valve 48, preferably a ball valve. Intermediate to the third valve 48 and the precipitation vessel 14, a fourth tee connection 50 is interposed in the fourth conduit 46. A feeder nipple 47, extending from the union connector 45 and passing through a conventional access port in the precipitation vessel 14, connects the fourth conduit 46 to the lower interior portion of the precipitation vessel 14. Terminating the first communication assembly within the precipitation vessel 14 is the filter assembly 22 which is connected to the feeder nipple 47.

Referring to FIGS. 2 and 3, the filter assembly 22 comprises a plurality of internal pipes 52, preferably of chlorinated polyvinyl chloride construction, each having a first end and a second end. The first ends of the internal pipes 52 are connected, via conventional elbow and tee joints, into a header 54 formed from chlorinated polyvinyl chloride piping. A fifth tee connection 56 is interposed in the header 54 and is joined conventionally to the feeder nipple 47.

With reference to the detailed view of the filter assembly 22 in FIG. 3, it may be seen that a cylindrical filter sleeve 58, preferably of polypropylene felt construction, is disposed over each internal pipe 52 of the filter assembly 22. Each filter sleeve 58 is penetrated over its surface by apertures having dimensions within the range of 5 to 100 microns, with apertures in the size range between 5 and 15 microns being preferable for the most complete filtrations. Filter sleeves of the type preferred are available commercially from Summit Scientific Corporation, 31 Dwight Place, Fairfield, New Jersey 07006.

One end of each filter sleeve 58 is sealed by a polypropylene end cap 60 which is in threaded connection with the second end of its corresponding internal pipe 52. A polypropylene gasket (not shown) maintains a fluid-tight seal between the external surface of each internal pipe 52 and the end of the filter sleeve 58 opposite the end cap 60. Within each filter sleeve 58, each internal pipe 52 carries a plurality of perforations 62 which permit fluid entering each internal pipe 52 from the fourth conduit 46 to exit and flow through the filter sleeve 58 into the interior of the precipitation vessel 14.

As shown in FIG. 2, a disconnection coupling 64 is interposed in the feeder nipple 47 within the precipitation vessel 14 to facilitate the removal of the filter assembly 22. Preferably the disconnection coupling 64 will comprise an OPW Kamlok adapter and coupler combination, available from Dover Corporation, OPW Division, P.O. Box 40240, Cincinnati, Ohio 45240. The construction of this combination is well-known in the art and will not be described further for purposes of this application. Once the disconnection coupling 64 is unlinked, the filter assembly 22 may be lifted from the precipitation vessel 14 for processing or cleaning, and thereafter replaced when required for silver recovery.

A second communication assembly effects fluid flow from the precipitation vessel 14 to the waste reservoir 16, which should be a container suitable for holding the acidic waste generated by the silver recovery method of the present invention. In the preferred embodiment of the silver recovery apparatus 10, a number of the components of the first communication assembly double as components of the second communication assembly, as will be described in more detail below.

Disposed at the terminus of the second communication assembly, in the precipitation vessel 14, is the above-described filter assembly 22, which is connected by the feeder nipple 47 and the fourth conduit 46 to the third tee connection 44. From the third tee connection 44, the second communication assembly extends to the first tee connection 34, via a fifth conduit 66. Interposed in the fifth conduit 66 is a fourth valve 68, preferably a ball valve.

At the first tee connection 34, the second communication assembly incorporates the first conduit 24, the pump 30 and the second conduit 36. From the second tee connection 38, the second communication assembly extends via a sixth conduit 70 to its terminus in the waste reservoir 16. Interposed in the sixth conduit 70 is a fifth valve 72, preferably a ball valve.

The cyanide solution reservoir 18, which supplies cyanide solution to reaction mixture in the precipitation vessel 14, preferably consists of a polyethylene heavy duty cylindrical tank, with cover, such as is available from United States Plastic Corporation, Lima, Ohio 45801. The lower interior portion of the cyanide solution reservoir 18 is connected to a third communication assembly, which selectively motivates fluid flow from the cyanide solution reservoir 18 to the precipitation vessel 14. Certain elements of the third communication assembly, in the preferred embodiment of the silver recovery apparatus 10, are shared with the previously described first communication assembly and second communication assembly, as will be described in more detail below.

As shown in FIG. 1, the third communication assembly comprises a seventh conduit 74 connecting the interior of the cyanide solution reservoir 18, via a conventional access port, to the fourth tee connection 50, which is interposed in the fourth conduit 46 as previously described. From the fourth tee connection 50, the third communication assembly incorporates the fourth conduit 46, which extends to the union connector 45 and connects, via the feeder nipple 47, to the filter assembly 22.

Further comprising the third communication assembly is a sixth valve 76, preferably a ball valve, which is interposed in the above described seventh conduit 74. Also in the seventh conduit 74, intermediate to the fifth valve 76 and the fourth tee connection 50, a sixth tee connection 78 is interposed. A final element of the third communication assembly is an elevating frame (not shown) which holds the cyanide solution reservoir 18 at an altitude above that of the precipitation vessel 14. The elevating frame thus permits the contents of the cyanide solution reservoir 18 to be gravity-fed into the precipitation vessel 14.

The source of inert pressurized gas 20 is connected to a fourth communication assembly, which directs and controls the flow of gas into the precipitation vessel 14. Some elements of the fourth communication assembly in the preferred embodiment of the silver recovery apparatus 10 are shared with the first, second and third communication assemblies. As will be discussed later in more detail, the shared fourth conduit 46 and feeder nipple 47, through which both the third and fourth communication assemblies discharge into the precipitation vessel 14, permits efficient injection and dispersion of liquid from the cyanide solution reservoir 18 into the precipitation vessel 14.

The fourth communication assembly comprises an eighth conduit 80 interconnecting the source of inert pressurized gas 20 with the sixth tee connection 78. From the sixth tee connection 78 the fourth communication assembly is identical to the third communication assembly, and incorporates the previously described seventh conduit 74 as far as the fourth tee connection 50, the fourth conduit 46, and the feeder nipple 47 to its terminus at the filter assembly 22 disposed in the precipitation vessel 14. Interposed in the eighth conduit 80, intermediate to the source of inert pressurized gas 20 and the sixth tee connection 78, is a seventh valve 82, preferably a ball valve.

A water source 84, comprising either a tap source of deionized water or a polyethylene storage tank similar to that used as the cyanide solution reservoir 18, is conventionally connected by a ninth conduit 86 to the lower portion of the precipitation vessel 14, via a conventional access port. Interposed in the ninth conduit 86 is an eighth valve 88, preferably a ball valve.

All of the above-described ball valves, tee connections, and conduits should be constructed from a material capable of resisting the effects of the heated, acidic material being transferred by the silver recovery apparatus 10. Chlorinated polyvinyl chloride has proven a satisfactory material in this regard. Care should be taken to assure that all conduits, tee joints and ball valves are constructed from the same material, in order to avoid possible differential chemical and temperature effects which may lead to warping or leaking in the communication assemblies.

During operation of the silver recovery apparatus 10, suitable source material and an appropriate quantity of solution containing nitric acid are combined in the digestion vessel 12 and the first valve 32 is thereafter closed. The transparent cover is secured to the top of the digestion vessel 12 by way of the releasable latching mechanisms, and the reaction of the acid with the source material is observed. When the reaction is complete, the first valve 32, the second valve 43 and the third valve 48 are opened, and the remaining valves are closed. The pump 30 is actuated, and material from the digestion vessel 12 is drawn through the first conduit 24 and sent through the second conduit 36, the third conduit 42 and the fourth conduit 46 into the precipitation vessel 14, which is sealed by its transparent cover. The filter 40 disposed in the second conduit 36 prevents solid matter which may have been present in the digestion vessel 12, as well as many soluble organic substances, from reaching the precipitation vessel 14.

When the precipitation vessel 14 has received all liquid transmitted from the digestion vessel 12, the pump 30 is deactuated and the first valve 32, the second valve 43 and the third valve 48 are closed. The eighth valve 88 is then opened to permit the dilution of the liquid held in the precipitation vessel 14 by water from the water source 84. When dilution is complete, the eighth valve 88 is closed and the sixth valve 76 and the seventh valve 82 are opened. Cyanide solution and low pressure gas are thereby discharged from the cyanide solution reservoir 18 and the source of inert pressurized gas 20, respectively.

Gas from the source of pressurized gas source 20 and cyanide solution from the cyanide solution 18 mix at the sixth tee connection, and flow into the precipitation vessel 14 as a bubbly froth to be discharged by the filter assembly 22. The apertures covering the surfaces of the filter sleeves 58 disperse the cyanide/gas mixture in all directions from the filter assembly 22, thus assuring rapid and complete mixing of the cyanide solution with the contents of the precipitation. The dispersing action of the filter sleeves 58 is augmented by the bubbles of gas in the added cyanide solution, which serve both to transport the added solution throughout the precipitation vessel 14 and to maintain complete mixing of the other contents of the precipitation vessel 14.

When the cyanide addition step is complete, the sixth valve 76 and the seventh valve 82 are closed, and the third valve 48, the fourth valve 68 and the fifth valve 72 are opened. The pump 30 is actuated and liquid from the precipitation vessel 14 is drawn through the fourth conduit 46, fifth conduit 66 and first conduit 24 to the pump 30 and is then sent through the second conduit 36 and sixth conduit 70 to the waste reservoir 16. Silver(I) cyanide precipitate remaining in the precipitation and vessel 14 is deposited on the filter sleeves 58 of the filter assembly 22. In order to remove remaining traces of nitric acid from the precipitate, the pump 30 is deactuated and the eighth valve 88 is thereafter opened to permit washing of the precipitate by water from the water source 84. After closing the eighth valve 88, the waste water remaining after washing may be drawn from the precipitation vessel 14 to the waste reservoir 16 by reactuating the pump 30. The washing process may be repeated by adding further water from the water source 84, until all traces of acid have been removed from the precipitate. Thereafter, the filter assembly 22 may be removed from the precipitation vessel 14 by disconnecting it via disconnection coupling 64. The silver(I) cyanide precipitate may then be collected from the surface of the filter sleeves 58.

It should be noted that the silver recovery apparatus 10 offers the capability for simultaneous operation of reactions in both the digestion vessel 12 and the precipitation vessel 14. Thus, for example, source material may be reacted with solution containing nitric acid in the digestion vessel 12 while at the same time liquids previously drawn from the digestion vessel 12 may undergo cyanide precipitation in the precipitation vessel 14.

While the above described apparatus represents the preferred embodiment of the present invention, it should be noted that the apparatus is subject to certain modifications. For example, in place of the pump 30 of the preferred embodiment, the outlet from a source of high pressure air may be disposed at an inlet in the cover of the digestion vessel, so as to force liquid through the conduits into the precipitation vessel. Similarly the outlet of a high pressure air source may be disposed at an inlet in the cover of the precipitation vessel so as to force liquid into the waste reservoir.

An additional modification of the present invention involves the use of only a single reaction vessel, in which the acid dissolution and cyanide precipitation steps are carried out sequentially. In such a modified apparatus, the pressure port of the pump is initially connected via the filter assembly to the lower interior portion of the reaction vessel. The reaction mixture formed by nitric acid digestion of the source material is drawn into a movable conduit connected to the suction port of the pump. The mixture passes through filter means and is then returned to the vessel via the filter assembly. After the cyanide precipitation step is completed, the pump connections are reversed so that the suction port is connected to the filter assembly and the reaction mixture is drawn from the vessel to the pump, leaving silver(I) cyanide precipitate on the filter sleeves. The reaction mixture flows to a waste disposal area via the movable conduit attached to the pressure port of the pump. Such a modified apparatus, while incapable of performing digestion and precipitation steps simultaneously, offers cost savings over the apparatus of the preferred embodiment described previously.

It is clear that the present invention is well adapted to carry out the objects and attain the ends and advantages mentioned as well as those inherent therein. It will be understood that numerous further changes may be made which will readily suggest themselves to those skilled in the art and which are encompassed within the spirit of the invention and as defined in the following claims.

What is claimed is:

1. A process for the separation of silver from source material comprising the steps of
   (1) reacting the source material with a solution containing nitric acid to form a reaction mixture having a substantially acidic liquid phase containing dissolved silver(I) nitrate;
   (2) separating the liquid phase from the remainder of the reaction mixture;
   (3) gradually adding to the liquid phase of the reaction mixture increments of a solution of an alkali metal cyanide to form silver(I) cyanide precipitate;
   (4) discontinuing addition of the cyanide solution when silver(I) cyanide precipitate ceases to form after an increment of cyanide solution is added; and
   (5) separating the silver(I) cyanide precipitate from the remainder of the liquid phase of the reaction mixture.

2. The process of claim 1 in which the pH of the liquid phase of the reaction mixture is adjusted, if necessary, to a value between about 0.5 and about 3.0 after step (2) and prior to step (3).

3. The process of claim 2 in which the solution containing nitric acid of step (1) contains between about 1% and about 50% nitric acid by volume, with the remainder of the solution being water.

4. The process of claim 3 in which the cyanide solution in step (3) has a concentration range between about 0.2 M and 10 M.

5. The process of claim 4 in which step 3 is carried out at room temperature.

6. The process of claim 5 in which the alkali metal cyanide of step (3) is sodium cyanide.

7. The process of claim 2 in which the solution containing nitric acid of step (1) contains between about 1% and about 5% nitric acid by volume, with the remainder of the solution being sulfuric acid.

8. The process of claim 7 in which the cyanide solution in step (3) has a concentration range between about 0.2 M and 10 M.

9. The process of claim 8 in which step 3 is carried out at room temperature.

10. The process of claim 9 in which the alkali metal cyanide of step (3) comprises sodium cyanide.

11. The process of claim 6 or 10 in which urea is added to the solution containing nitric acid which is reacted with the source material in step (1).

12. The process of claim 1 in which the liquid phase of the reaction mixture is agitated by an inert pressurized gas during step (3).

13. The process of claim 1 in which silver metal is recovered from silver(I) cyanide precipitate produced by step (5).

14. The process of claim 1 in which the separation of step (2) is accomplished by filtration.

15. The process of claim 1 in which separation of silver(I) cyanide precipitate from the liquid phase of the reaction mixture in step (5) is accomplished by filtration followed by a water washing of the silver(I) cyanide precipitate.

* * * * *

UNITED STATES PATENT AND TRADEMARK OFFICE
CERTIFICATE OF CORRECTION

PATENT NO. : 4,218,242

DATED : August 19, 1980

INVENTOR(S) : John E. LeGrange

It is certified that error appears in the above—identified patent and that said Letters Patent is hereby corrected as shown below:

Column 2, line 5, after "CN" delete "31" and insert -- - --.

Signed and Sealed this

First Day of September 1981

[SEAL]

Attest:

Attesting Officer

GERALD J. MOSSINGHOFF

Commissioner of Patents and Trademarks